United States Patent [19]

Keller

[11] 4,153,398
[45] May 8, 1979

[54] APPARATUS FOR PRODUCING CAST-IN-PLACE PIPE EMPLOYING PERMANENT PIPE MOLD

[76] Inventor: George M. Keller, 900 Indian Way, Novato, Calif. 94947

[21] Appl. No.: 871,582

[22] Filed: Jan. 23, 1978

Related U.S. Application Data

[62] Division of Ser. No. 648,241, Jan. 12, 1976, Pat. No. 4,075,300.

[51] Int. Cl.² ............................................. B28B 21/06
[52] U.S. Cl. .......................................... 425/59; 425/64; 425/89; 425/122; 425/130
[58] Field of Search ...................... 425/63–65, 425/59, 432, 456, 89, 122, 130; 264/33, 34

[56] References Cited

U.S. PATENT DOCUMENTS

| 3,380,259 | 4/1968 | Rubenstein | 425/59 |
| 3,583,046 | 6/1971 | Dickinson et al. | 425/63 |
| 4,017,226 | 4/1977 | Long | 425/59 |

*Primary Examiner*—John McQuade
*Attorney, Agent, or Firm*—Townsend and Townsend

[57] ABSTRACT

Continuous concrete pipe is produced in an open trench by drawing a sled along the trench. The sled has a fresh concrete intake chute which supplies the concrete to a pipe-forming mechanism that generates the pipe. The lower pipe half is supported by the trench. To support the upper pipe half, a plastic material is given a convex shape complementary to the concave interior of the pipe. The plastic material is formed over a convex mandrel carried by the sled forward (in the direction of movement of the sled) of the intake means so that the plastic material hardens before contacted by wet concrete from the intake means. The mandrel extends rearwardly past the intake means to provide support for the plastic mold while the pipe is formed. Alternative ways for making the plastic mold are described.

17 Claims, 10 Drawing Figures

U.S. Patent  May 8, 1979  Sheet 1 of 2  4,153,398
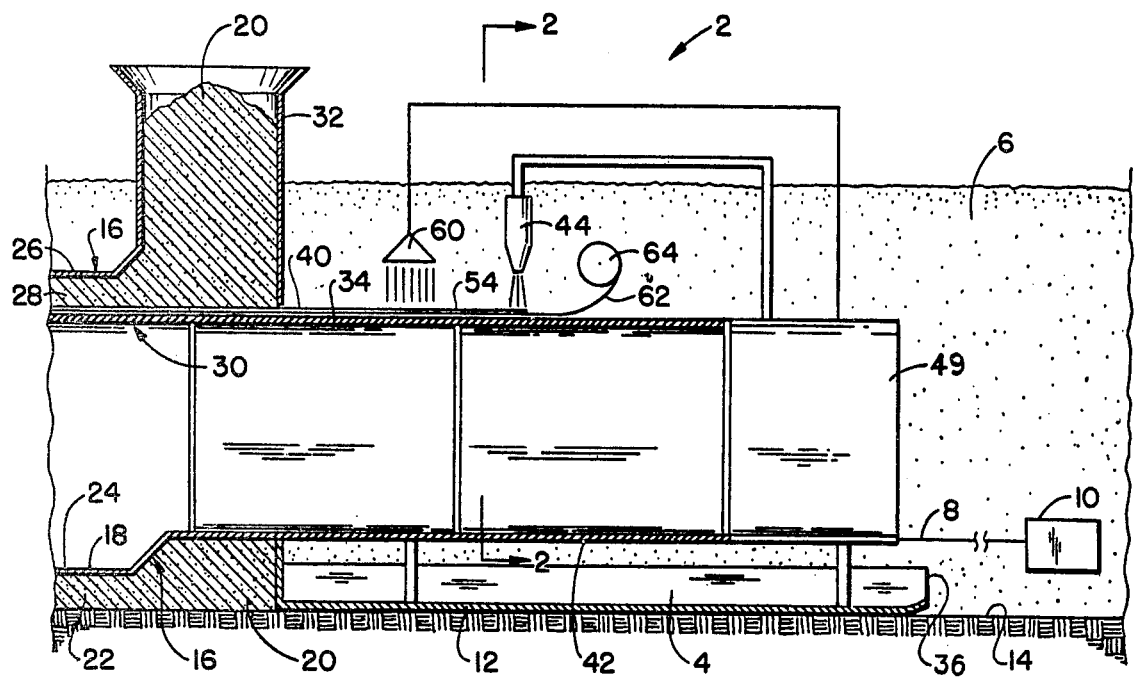
FIG._1.
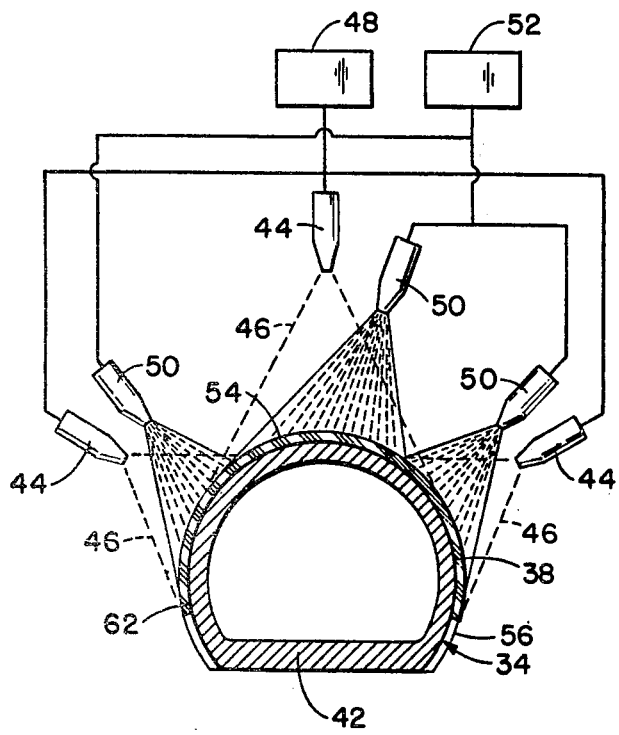
FIG._2.
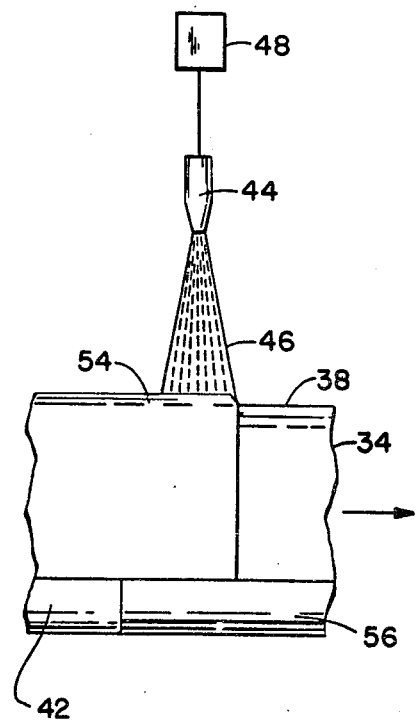
FIG._3.

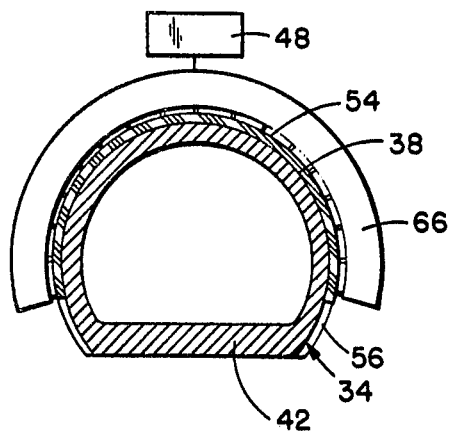
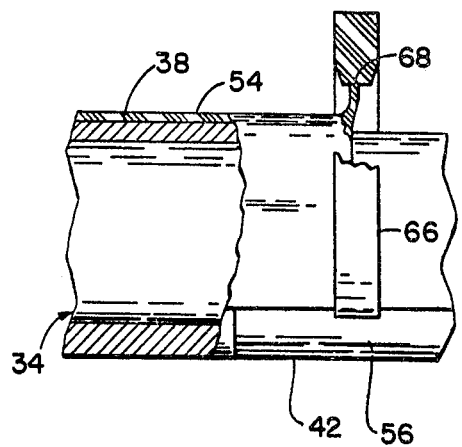
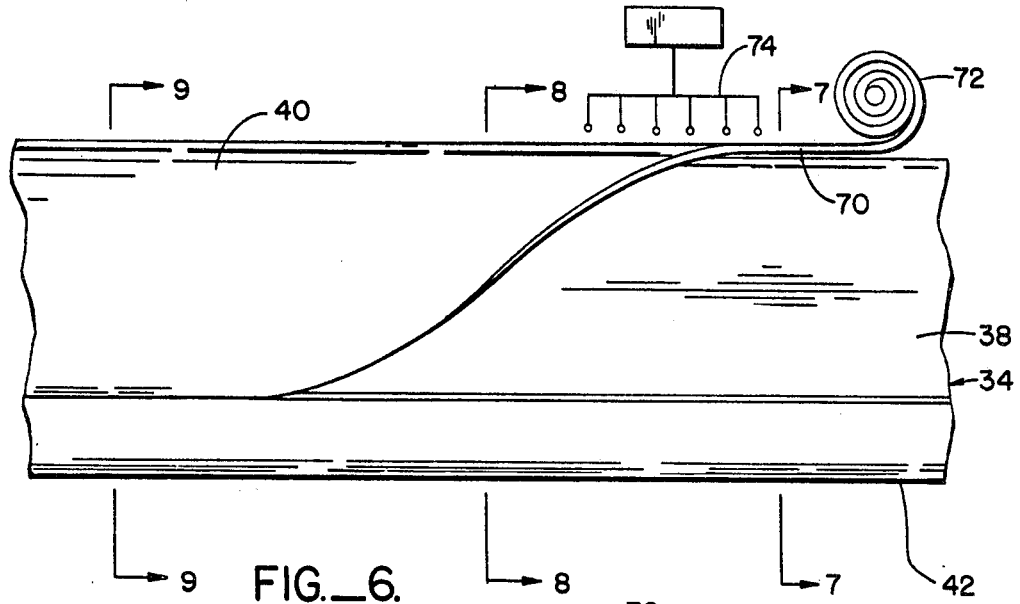
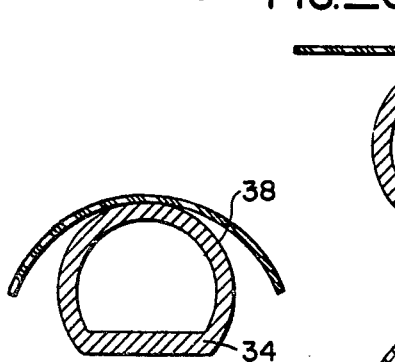
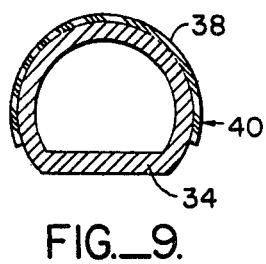
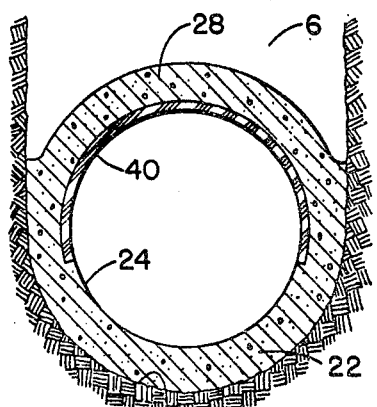

APPARATUS FOR PRODUCING CAST-IN-PLACE PIPE EMPLOYING PERMANENT PIPE MOLD

This is a Division of application Ser. No. 648,241, filed Jan. 12, 1976, now U.S. Pat. No. 4,075,300.

BACKGROUND OF THE INVENTION

The in situ production of continuous, jointless concrete pipe in open trenches is now widely accepted because it yields high quality pipe at modest costs. Under one method pipe is produced by employing the bottom of an open trench as the supporting medium for the lower pipe half while special molds are provided to support the upper pipe half until the concrete has hardened. The molds are relatively short lengths of metal sheets having a curved shape complementary to the interior curvature of the pipe.

After the concrete has hardened, the molds must be removed by a workman who enters the pipe, releases the molds and then removes them by dragging them to the open end of the pipe. Methods and apparatus for constructing such pipe are described, for example, in U.S. Pat. Nos. 2,731,698; 3,106,760; 3,113,364; and 3,534,449. U.S. Pat. No. 3,785,759 proposes to delete interior pipe molds for supporting the upper pipe half while the concrete hardens. As far as is known to applicant, the method proposed in the last mentioned patent is technically and/or economically not feasible and has not been employed on a commercial scale.

Although the pipe-forming methods and machines proposed in the patents have resulted in substantial improvements for laying large diameter pipes, they have shortcomings. The need for workmen to enter the pipes to remove the molds limits the production of such pipe to a minimum pipe diameter of at least about 24 inches. Moreover, the removal of the molds in and of itself requires substantial manual labor and is, therefore, expensive.

In addition, it is necessary to store large numbers of pipe molds at the construction site and each mold must be individually handled and inserted into the pipe-forming machine. Again, this involves substantial labor and complicates the construction of the machine. The initial costs as well as the subsequent maintenance of the machine are thereby significantly increased.

The prior art concrete pipe forming methods and machines proposed in the patents have the further drawback of requiring an intermittent cessation of the pipe forming method to permit the removal of pipe molds from the interior of already laid pipe. This significantly reduces the production rate attainable with such prior art pipe forming machines. Additionally, once the molds are removed from the pipe they leave ring-shaped depressions on the interior of the pipe. These depressions adversely affect the hydraulic characteristics of the pipe since they cause turbulence in the medium flowing through the pipe.

Lastly, jointless concrete pipe produced in accordance with the prior art exposed the raw concrete to potentially corrosive fumes, which in time, could damage or destroy the pipe. The problem is particularly acute for sewage drain pipe which releases concrete corroding fumes. In the past, such corrosion was counteracted by coating the finished pipe with a suitable protective agent. This, however, is an expensive task since low cost coating techniques such as dip coating of short pipe sections cannot be employed in seamless, in situ formed pipe.

SUMMARY OF THE INVENTION

The present invention seeks to overcome disadvantages when producing in situ formed pipes in accordance with the prior art by eliminating the multiple handling of the concrete support molds and by automatically providing a protective layer on the interior surface of at least the upper portion of the pipe to help prevent pipe corrosion. Generally speaking, the present invention contemplates the formation of pipe by forming the lower half of the pipe as in the past, employing the trench bottom as a support mold. The support mold for the upper half of the pipe is a continuous length of a relatively thin plastic material that is shaped to conform it to an interior surface of the upper pipe half. The plastic material is rendered substantially rigid, e.g., by curing it to thereby form a rigid, continuous, longitudinally extending mold. The concrete is cast about the mold and the mold is permitted to permanently remain on the pipe interior in contact with the hardened concrete.

Thus, the mold is formed in situ, much like the pipe itself and it becomes a permanent part of the pipe. The mold is centered relative to the upper pipe half and extends over at least a major portion thereof; preferably over an arc of 180° or more and normally over an arc of less than 360°.

In terms of apparatus, the present invention contemplates the provision of a sled for placement in and movement through an open trench. The sled mounts concrete forming means for compacting fresh concrete into pipe with the lower portion of the pipe supported by the trench bottom. The sled also mounts concrete intake means positioned above the concrete forming means for receiving the fresh concrete and supplying it to the former. Also mounted to the sled is means for forming a permanent, longitudinally extending mold that supports the upper portion of the pipe in its desired shape until the concrete has hardened.

The mold forming means comprises a mandrel attached to the sled and positioned forward of the intake means. The mandrel has an upwardly facing convex surface complementary to the concave inner surface of the finished pipe and it extends rearwardly relative to the direction of movement of the sled through the trench past the intake means. Means is provided for applying a hardenable plastic material over the convex mandrel surface at a point positioned sufficiently forward of the intake means so that the applied plastic material has time to harden before it passes beneath the intake means and comes into contact with the fresh concrete. Means is further preferably disposed between the mandrel and the plastic material enabling the continuous separation of and relative movement between the plastic material and the mandrel as the sled is moved through the trench.

Various ways of forming the plastic mold can be employed. For example, a liquid polymerizable resin can be sprayed via a suitable spray nozzle onto the convex mandrel surface. The spray nozzle can be a mixing nozzle which mixes the resin with a suitable catalyst and promoter. Alternatively, separate nozzles for the resin and the catalyst/promotor can be employed.

A wide variety of resins can be used. They include styrene polyester copolymer such as SELECTRON 50081, manufactured by PPG Industries, Inc.; LAMINAC 4116, manufactured by the American Cyanamid Company, Inc.; or PARAPLEX P43, manufactured by the Rohm & Haas Company, Inc. Generally speaking, these resins comprise a solid or liquid polyester dissolved in a reactive monomer such as styrene monomer. The reactive polyester copolymerizes with the styrene by virtue of the unsaturated molecules within its composition, such as maleic anhydride, fumeric acid, and the like.

Other available resin materials include vinyl ester, such as DERAKANE, manufactured by the Dow Chemical Company, Inc.; acrylic syrups; and condensation polymerization resins such as phenol formaldehyde resins, urea formaldehyde resins, resorcinal formaldehyde resins and the like.

Typical catalyst and promotor combinations for the polyester resins are a combination of methyl ethyl ketone peroxide and cobalt naphthanate; dimethyl aniline and benzoyl peroxide, or ascorbic acid and methyl isobutyl ketone peroxide and a number of other activating systems.

To increase the strength of the cured plastic material, it is preferably reinforced by incorporating therein fibers such as glass fibers, celluloid fibers, synthetic polymeric fibers, such as Nylon or Dacron, carbon fibers and the like.

Lastly, to reduce material costs, low cost fillers can be incorporated. The fillers include such products as calcium carbonate, talc, china clay, sand, glass microspheres and the like.

The incorporation of both the fiber reinforcements and the filler follows conventional practice. Thus, the fibers may be supplied from roving or fiber spools or they may be incorporated in the form of woven cloth, woven roving or a random fiber mat. When roving or fiber spools are employed they are introduced into the spray streams either upstream of the spray nozzles or by spraying or blowing them into the resin spray as it is applied to the mandrel.

An alternative method of forming the plastic mold is to provide a flat sheet of a thermal plastic which may be reinforced. The flat sheet is positioned over the convex mandrel and heated so that it drapes over the mandrel where it cools, hardens and takes on the shape of the mandrel. Fresh concrete can thereafter be poured over it. Since the mandrel supports the mold when fresh concrete is poured thereover, the cooling and, thereby, the hardening of the thermoplastic sheet is enhanced by its contact with the cold concrete. Faster operating times can thereby be achieved.

Materials for the thermo-plastic sheet include polystyrene, polyethylene, polyvinyl chloride, acrylic, polyester and the like. They are heated to a temperatue which is normally between 200°-300° F., sufficient to drape the sheet over the mandrel.

Another alternative for the construction of the plastic mold is to extrude plastic of the desired shape from an extrusion die. In this alternative, powdered or granulated thermoplastic material is fed from a hopper to an extruding screw. The plastic is heated to soften it and extruded or protruded from an opening in the die which corresponds to the desired shape of the mold. This alternative has the advantage that the finish formed shape of the mold is achieved without requiring the production of an intermediate flat sheet such as is required in the preceding alternative.

Other methods for constructing the mold will, of course, come to mind. For example, hot melt resin such as asphalt crystalline waxes, crystalline polymers and the like, which can be reinforced, can be sprayed or poured over the mandrel. Also, rigid foams, such as polyurethane foam can be employed for forming the mold over the mandrel.

In each instance (except in the extrusion alternative) the mold is formed over the mandrel and the mandrel supports the mold in its desired orientation and shape until the pipe has been finish formed. Further, the mold is continuously formed, that is, without joints or interruptions and once the mold has been formed on the mandrel, it remains stationary relative to the trench and the pipe being cast about it while relative movement takes place between the mold and the supporting mandrel.

To prevent the mold from adhering to the mandrel, suitable mold release means are employed. The release means can comprise a highly polished convex mandrel surface, a releasing agent such as TEFLON applied to the mandrel, or the application of a thin separating film such as a plastic or cellophane film which is placed between the mandrel and the mold being formed. The film adheres to the mold and slides relative to the mandrel.

From the above it will be apparent that the present invention eliminates the heretofore troublesome and costly installation and removal of independent and costly mold forms. By eliminating the reuse of molds the wear and tear inflicted on them from the continuous handling is avoided. Moreover, the need for a workman to enter the pipe to release and remove the mold forms has been eliminated. This not only reduces labor costs for producing the pipe but enables the production of virtually any pipe size well below the heretofore minimum pipe size of about 24 inches. The present invention further enables the continuous, uninterrrupted 24-hour a day production of pipe since the need for intermittently terminating production to allow for the removal of mold forms is eliminated. Also, surface irregularities on the interior of the pipe caused by the mold forms are eliminated. This in turn eliminates a source of turbulence for the medium flowing through the pipe. Thus, the present invention permits a more rapid production of pipe, reduces production costs and enhances the flow characteristics of the pipe. Thus, the present invention both facilitates the construction of the pipe and reduces production costs.

In addition, since the plastic mold becomes a permanent part of the pipe which spans at least the upper half thereof the mold provides an ideal protection for the concrete against concrete attacking corrosives, such as are frequently found in sewage fumes. This protection is achieved without any additional labor. Thus, the present invention substantially enhances the durability of concrete pipe.

BRIEF DESCRIPTION OF THE DRAWINGS

FIG. 1 is a fragmentary, schematic side elevational view of a seamless concrete pipe forming machine constructed in accordance with the present invention;

FIG. 2 is a front elevational view, in section, and is taken on line 2—2 of FIG. 1;

FIG. 3 is a fragmentary, side elevational view of FIG. 2;

FIG. 4 is a front elevational view, in section, similar to FIG. 2 but illustrates another embodiment of the present invention;

FIG. 5 is a side elevational view, with parts broken away, of FIG. 4;

FIG. 6 is a fragmentary side elevational view of another embodiment of the present invention;

FIGS. 7, 8 and 9 are cross-sectional figures taken on lines 7—7, 8—8 and 9—9, respectively, of FIG. 6; and FIG. 10 is a cross-sectional view of a finished jointless concrete pipe produced in accordance with the present invention.

DESCRIPTION OF THE PREFERRED EMBODIMENTS

Referring to FIG. 1, a pipe-forming machine 2 constructed in accordance with the present invention is generally illustrated. Principally, it comprises a sled or carriage 4 which can be drawn along an open trench 6 via a cable 8 connecting the carriage with a pulling mechanism 10, for example. The carriage rests on trench bottom 14 and mounts a pipe-forming mechanism 16 which is broadly defined by a lower trough form 18 which compresses fresh (deformable) concrete 20 into a lower pipe half 22 having an interior, concave pipe surface 24. As is best seen in FIG. 10 the lower pipe half is fully supported by trench bottom 14.

The pipe-forming mechanism 16 further includes an upper forming section 26 which casts the fresh concrete into a upper pipe half 28 about an interior pipe form 30 the exact construction of which is described hereinafter. The pipe-forming mechanism 16 communicates with an upright concrete intake hopper 32 into which fresh concrete is continuously poured by conventional means while the sled 4 is pulled in a forward direction, that is, to the right as viewed in FIG. 1.

For the purposes of the present invention, the pipe-forming mechanism 16 is only schematically illustrated. The above-referenced issued U.S. patents describe its construction in greater detail. Furthermore, for the purposes of this specification and the claims the term "concrete" is intended to include and includes any readily deformable, hardenable material and specifically includes cementitious material having such binders as cement or gypsum, and fillers such as sand aggregate and the like. Furthermore, for the purposes of this applications and the claims, the term "plastic material" is intended to include and includes all materials falling within the earlier described class of materials which have the general characteristic of being liquid, soft or pliable and hardenable by adding suitable chemical agents thereto, by subjecting the material to heat, radiation or other physical hardening agents or materials which are supplied in a rigid or semi-rigid form but which can be temporarily softened as by subjecting them to heat.

Referring now to FIGS. 1-3, the pipe-forming machine includes a mandrel 34 which extends from adjacent a forward end 36 of the sled rearwardly past concrete intake 32 and, preferably, past or to closely adjacent the aft end of the concrete forming mechanism 16. In the illustrated embodiment the mandrel has a generally cylindrical configuration and it includes an upwardly facing convex surface 38. The mandrel has a diameter which equals the diameter of the concave pipe surface 24 less the thickness of a mold 40 formed over the convex surface for supporting the freshly formed pipe as is more fully described hereinafter. A lower portion 42 of the mandrel may be flattened and is supported on the sled.

One or more, e.g., three spray nozzles 44 are secured to sled 4 and mounted about the convex mandrel surface 38 so their respective spray cones 46 fully cover the convex surface. The spray nozzles are in fluid communication with a liquid resin supply 48 defined by a tank 49 which may be carried by sled 4. The nozzles may be of any conventional construction and they mix the resin with a suitable catalyst/promoter as above discussed. The detailed construction and operation of the nozzles does not form part of this invention and is therefore not described herein. Also provided are means 50 for adding to the nozzle spray suitable fiber reinforcement and/or filler material as above-discussed. The fiber/filler material is supplied from a fiber/filler source 52 schematically illustrated in FIG. 2.

In operation, nozzles 44 spray a plastic layer 54 onto the convex mandrel surface 38 over the desired arc. Since the resin is initially of a relatively low viscosity, it is preferred to include an enlarged diameter lower portion 56 which defines the ends of the convex mandrel surface and which prevents resin from flowing in an uncontrolled manner down the mandrel before it has sufficiently hardened.

While plastic layer 54 is formed the sled is drawn in a forward direction (to the right as seen in FIG. 3). The layer remains stationary relative to trench 6 while it slides relative to sled 4 and mandrel 34. The distance between spray nozzles 44 and concrete intake 32 is chosen so that plastic layer 54 has cured or hardened into a substantially rigid, convex, continuous and homogeneous interior pipe mold 40 before it comes into contact with fresh concrete. Curing of the plastic can be enhanced by including a heater 60 between the nozzles and the hopper. The heater may be an infrared heater, a hot air heater and must, of course, be combined with the use of a heat sensitive catalyst such as benzoyl peroxide, in which case the temperature of the curing plastic can be raised to above 180° F.

Alternatively, other physical means for enhancing the curing of the plastic can be employed. For example, in most addition polymerization resins, polyester resins, acrylic resins, vinylester resins, and the like, polymerization can be enhanced by using actinic light. In general, ultraviolet light of wave lengths between 2,850 and 3,600 angstroms and a proper light sensitive catalyst will cause rapid polymerization of the resin at room temperature. Furthermore, the addition of heat increases the reaction rate. Typical ultraviolet light sensitive catalysts are benzoin, acetoin, alpha chloro methyl naphthalene and the like; they can be employed in concentrations of between one-half to three percent.

As the sled is drawn forward, concrete intake 32 is drawn over the freshly formed and hardened mold 40 and the pipe is formed thereabout. It is preferred that the pipe-forming mechanism 16 be constructed so that the mold is ultimately embedded in concrete as is illustrated in FIG. 10. In this manner, the wet concrete helps to support the mold in its arcuate position; after the concrete hardens a mechanical lock for the mold is formed to prevent its accidental release.

To increase the bond between the plastic mold 40 and the concrete, it is presently preferred that the exterior surface of the mold be roughened. This can be done with a suitable roll or other equipment (not shown in the drawings) which forms grooves, depressions and/or protrusions in the exterior mold surface so that the concrete, when it is poured over the mold, can enter and surround the grooves, depressions and protrusions. In this manner, the mold is mechanically locked to the pipe over the full exterior surface of the mold. Alternatively, barbs, hooks and the like of a sufficient size can be embedded in the freshly formed plastic before the plastic hardens so that they protrude beyond the plastic mold 40 and extend into the concrete poured thereabout. This also yields a mechanical interlock which enhances the bond between the plastic mold and the concrete pipe.

To facilitate the separation of the plastic layer 54 and the finished plastic mold 40 from the convex mandrel surface 38, the surface is either highly polished or coated with a release agent such as tetra fluoroethylene, commonly sold under the trademark TEFLON. Alternatively, a continuous separating film 62 is rolled off a supply roll 64 carried by sled 4 and nozzles 44 spray the resin onto the film so that the film separates the resin from the mandrel. Suitable materials for the separating film include cellophane and polyethylene. Furthermore, the film and resin materials may be chosen so that the film adheres permanently to the resin. The film furnishes additional corrosion resistance and can be chosen to help protect the concrete or the plastic mold against a particularly corrosive substance.

Referring to FIGS. 1, 4 and 5, in another embodiment of the invention the spray nozzles 44 shown in FIGS. 1–3 are replaced with a horseshoe-shape resin curtain coating device 66 which is placed over the convex mandrel surface 38. The curtain-forming device has a plurality of closely adjacent holes 68 through which the resin is discharged onto mandrel 34. As before, a source 48 supplies the resin to the device 66 and fiber reinforcements and/or suitable fillers may be incorporated in a conventional manner for the purposes discussed above. In all other respects the embodiment shown in FIGS. 4 and 5 are operational similar or identical to the previously discussed embodiment of the invention.

The reference numerals illustrated in FIG. 4 not specifically discussed refer to like elements shown in and discussed in connection with the description of the embodiment of the invention shown in FIGS. 1–3.

Referring to FIGS. 1 and 6–9, in yet another embodiment of the invention, mold 40 is formed from an initially flat sheet 70 constructed of a thermo-plastic material such as polyethylene, PVC and the like. The flat sheet is drawn off a supply roll 72 mounted to sled 4 and passed beneath a heater 74 also carried by the sled and positioned forward of the concrete intake hopper 32. The heater may, for example, be an infrared rod heater which heats the flat sheet above the softening point for the material to allow it to sag and drape over the convex mandrel surface 38. The cross-sectional FIGS. 7–9 illustrate the progress of the initially flat sheet (FIG. 7) to the finish formed mold 40 (FIG. 9). It is apparent that the flat sheet can be supplied in forms other than on rolls.

Additional alternative methods for forming mold 40 will come to mind to those skilled in the art. As already briefly mentioned, these alternatives include the extrusion of the mold from a die with an appropriately shaped die opening (in which case thermo-setting or thermo-curing plastics can be employed), the use of hot melt resins or the use of foamed materials. Since the construction and use of the underlying equipment is conventional, it is not further described herein.

The thickness of the finish formed mold depends upon such factors as the rigidity of the plastic, the extent to which it has cured when the underlying support furnished by the mandrel is withdrawn (as the sled moves forward through the trench), the weight of the concrete and the wall thickness of the pipe, the maximum permissible deflection of the mold, the span of the mold arc as determined by the pipe diameter, and of course, the strength of the material of which the mold is constructed. A thickness of the mold between 0.010 and 0.100 inch would normally be sufficient for the most commonly encountered pipe diameters, wall thicknesses and mold materials.

I claim:

1. Apparatus for the formation of long lengths of continuous pipe in an open trench comprising a sled for movement through the trench; first means connected with the sled for forming a lower pipe half in the trench; second means connected with the sled for forming an upper pipe half homogeneously with the lower half; and intake means for feeding cementitious material to the first and second pipe-forming means while the sled moves through the treanch; the second means including a mandrel connected with the sled having an upwardly convex surface disposed forward of the intake means and having a shape closely approximating the shape of an interior surface of the upper pipe half; means for placing a relatively thin layer of a deformable and hardenable plastic material in its deformable state over the convex mandrel surface to conform the material to the mandrel, the placing means being positioned relative to the intake means so that the plastic material conforms to the mandrel while in its deformable state and has substantially hardened when contacted by the cementitious material; and means permitting the separation of the plastic layer from the mandrel surface so that the mandrel can be moved relative to the plastic layer while the plastic layer remains stationary relative to the trench.

2. Apparatus according to claim 1 wherein the separation permitting means comprises means for placing a separating film between the plastic layer and the mandrel.

3. Apparatus according to claim 2 wherein the separating film comprises a layer of teflon applied to the portion of the mandrel contacted by the plastic layer.

4. Apparatus according to claim 2 wherein the film comprises a thin plastic film and including means for placing the plastic film between the mandrel and the plastic layer, whereby the plastic film remains stationary relative to the layer and the mandrel moves relative to the film.

5. Apparatus according to claim 1 wherein the separation permitting means comprises a polished convex mandrel surface over which the plastic layer is placed.

6. Apparatus according to claim 1 including means for applying the plastic layer over an arc of at least about 180°.

7. Apparatus according to claim 1 including means for applying the plastic layer over an arc of more than 180°.

8. Apparatus according to claim 1 wherein the intake means for the cementitious material comprises an upwardly opening intake chute for receiving the cementitious material, and wherein the mandrel extends in a rearward direction relative to the sled travel through the trench past the intake chute to provide support for the hardened plastic layer while the cemetitious material is applied thereover.

9. Apparatus according to claim 1 wherein the plastic layer placing means comprises at least one spray nozzle for applying a plastic resin to the convex mandrel surface.

10. Apparatus according to claim 9 including means for applying fiber reinforcements to the plastic layer before the latter hardens.

11. Apparatus according to claim 10 including means for applying a filler material to the plastic layer before the latter hardens.

12. Apparatus according to claim 1 wherein the plastic layer placing means comprises means for continuously feeding an elongate plastic sheet to the mandrel surface forward of the intake means, and means for heating the sheet to soften it and drape it over the mandrel surface.

13. Apparatus according to claim 1 wherein the plastic layer placing means comprises means for extruding a layer of plastic material and placing the extruded material onto the mandrel surface.

14. Apparatus for the formation of continuous concrete pipe in an open trench comprising a sled for movement through the trench; concrete forming means connected with the sled for forming fresh concrete into a pipe having a lower portion supported by a bottom of the trench; concrete intake means positioned above the concrete forming means for receiving the fresh concrete and supplying it to the forming means; and means for forming a permanent, and longitudinally extending mold for supporting an upper portion of the pipe in its desired shape until the concrete has hardened; the mold forming means comprising an upwardly convex mandrel attached to the sled and positioned forward of the intake means, the mandrel having an upwardly facing convex surface complementary to a concave inner surface of the finished pipe; the mandrel further extending rearwardly relative to the direction of movement of the sled through the trench past the intake means; means for applying a hardenable plastic material over the convex mandrel surface, the last mentioned means being positioned a sufficient distance forward of the intake means so that the plastic material, when applied to the mandrel in its deformable state, conforms in shape to the shape of the mandrel and is hardened when it passes beneath the intake means and comes in contact with the concrete; and means disposed between the mandrel and the plastic material enabling the continuous separation of and relative movement between the plastic material and the mandrel as the sled is moved through the trench.

15. Apparatus according to claim 14 including means disposed between the plastic applying means and the intake means for facilitating the hardening of the plastic material.

16. Apparatus according to claim 14 wherein the plastic applying means comprises means for applying a settable resin in its fluid form over the mandrel.

17. Apparatus according to claim 14 wherein the plastic applying means comprises means for draping a thermoplastic material over the mandrel.

* * * * *